United States Patent [19]
Beier et al.

[11] Patent Number: 6,071,419
[45] Date of Patent: Jun. 6, 2000

[54] FLUID FILTER, METHOD OF MAKING AND USING THEREOF

[75] Inventors: Scott B. Beier; Rex A. Adams, both of Omaha, Nebr.

[73] Assignee: Products Unlimited, Inc., Omaha, Nebr.

[21] Appl. No.: 08/146,901

[22] Filed: Oct. 20, 1993

[51] Int. Cl.$^7$ .......................... B01D 37/00; B01D 29/56; B32B 31/20; B32B 31/18

[52] U.S. Cl. .......................... 210/767; 210/483; 210/488; 210/489; 210/490; 210/496; 210/503; 210/506; 210/508; 55/486; 55/514; 55/527; 55/DIG. 44; 156/160; 156/163; 156/229; 156/250

[58] Field of Search .................................. 210/767, 483, 210/488, 489, 490, 494.1, 496, 503, 506, 508, 509, 510.1; 55/486, 514, 525, 527, DIG. 44; 156/160, 163, 229, 250

[56] References Cited

U.S. PATENT DOCUMENTS

| | | |
|---|---|---|
| 1,743,675 | 1/1930 | Jordahl . |
| 2,582,777 | 1/1952 | Grozinger . |
| 3,026,968 | 3/1962 | Koskinen ................................. 183/73 |
| 3,050,193 | 8/1962 | Gillick, Jr. et al. .................. 210/494.1 |
| 3,253,072 | 5/1966 | Scragg et al. ............................ 264/147 |
| 3,592,769 | 7/1971 | Decker .................................. 210/494.1 |
| 3,912,634 | 10/1975 | Howell ..................................... 210/222 |
| 4,019,987 | 4/1977 | Krasnow ................................. 210/483 |
| 4,105,724 | 8/1978 | Talbot ..................................... 261/112 |
| 4,443,233 | 4/1984 | Moran ........................................ 55/97 |
| 4,555,342 | 11/1985 | Grant ................................... 210/493.1 |
| 4,579,658 | 4/1986 | Moller ..................................... 210/483 |
| 4,878,974 | 11/1989 | Kagauia ................................. 156/163 |
| 4,904,288 | 2/1990 | D'Augereau .............................. 55/485 |
| 5,137,634 | 8/1992 | Butler et al. ............................ 210/490 |

*Primary Examiner*—John Kim
*Attorney, Agent, or Firm*—Zarley, McKee, Thomte, Voorhees & Sease; Dennis L. Thomte

[57] ABSTRACT

A fluid filter includes a first batting of high loft, non-woven, fibrous fluid-permeable material with a plurality of openings formed through the thickness thereof across the length and width of the batting. A second layer of high loft, non-woven, fluid-permeable fibrous batting is attached to the first layer and extends across the entire length and width of the first layer. Preferably, the first and second layers are adhered together to form a single integral fluid filter. In the preferred form of the invention, the openings in the first batting have side walls which are perpendicular to the upper surface of the batting, such that fluid flow impacts on the upper surface of the batting, rather than directly impacting on the side walls.

21 Claims, 4 Drawing Sheets

FLUID FILTER, METHOD OF MAKING AND USING THEREOF

TECHNICAL FIELD

The present invention relates generally to disposable filters for fluid streams, and more particularly to a combination of non-woven battings having an expanded batting layer mounted on a homogenous batting layer, for the removal of particulate from an air stream.

BACKGROUND OF THE INVENTION

Many materials and combinations of materials, have been used as filtration media to remove solid or liquid particulate from fluid streams. The capabilities of such filter media are judged according to three main criteria: (1) the particulate removal efficiency (i.e. the ability of the filter media to capture and retain particulate), (2) the pressure drop for a given flow rate of fluid through the media (which is utilized as a measure of the power required to move the fluid stream through the media), and (3) the holding capacity (i.e., the total amount of particulate which can be retained by the media before the pressure drop becomes so great that the media must be cleaned or replaced).

Residential and commercial heating, ventilating and air conditioning systems (HVAC systems) deal with a wide variety of particulate, including dust, lint and pollen. Similar filtration systems are utilized in industrial spray painting booths to collect paint droplets from the exhaust air stream. Dust collection systems are also utilized in industrial settings to capture the by-products of manufacturing processes which are entrained in air streams. Obviously, the removal of such particulate in all of these settings are desirable for reasons of health, comfort and aesthetic appeal.

All filter media rely generally on either the attractive force between the filter media and the particulate, or "physical barrier filtration", to remove particulate from a fluid stream. The use of attractive forces includes electromechanical forces as well as chemical/adhesive forces. An example of electromechanical forces includes electrostatic filtration, wherein the natural electrical charge on a particulate, and the natural electrical charges on a filter media are such that the particulate is attracted to and retained on the filter media. An example of chemical/adhesive forces is present in the filtration of paint droplets from an air stream, wherein the paint droplets will adhere to the surface of the filter media. Physical barrier filtration utilizes filter media with openings sufficiently small to prevent particulate of a predetermined size (larger than the openings) from passing through the filter media.

Prior art "disposable" filters are designed to be built from low cost materials which may be affordably replaced when the filters become "dirty" (i.e. when the increased pressure drop due to retained particulate requires an undesirable increase in energy to move the fluid stream through the filter). Disposable filters are generally comprised of four constructions: (1) thick sheets (½ inch to 2 inch) of stabilized, high loft, non-woven fibrous media; (2) thin sheets (less than 1/16 inch) of stabilized non-woven fibrous media laminated to a metallic mesh material and then mechanically pleated; (3) thin sheets (less than ¼ inch) of stabilized woven or non-woven fibrous media which has been sewn or glued to form a filter element which consists of multiple "bags"; and (4) stacked layers of expanded paper.

The stabilized, non-woven fibrous materials used for the first three above-described types of disposable filtration media are generally produced from natural and/or man-made fibers such as glass, cotton, polyester or polypropylene. The individual fibers may be either of a discrete staple length or continuous filaments. The stabilization methods for these fibrous media are generally either mechanical (such as needle punching), chemical (utilizing glues or binders), or thermal (utilizing plastic materials incorporated within a batting which are melted to bind the remainder of the fibers upon cooling of the melted material). These stabilized woven fibrous materials generally consist of layered sheets of large diameter man-made filaments loosely woven to form a fabric sheet.

The fourth construction type identified above typically consists of a plurality of layers of expanded paper. Each layer of this type of filter is created from a continuous sheet of paper which has been slit repeatedly, allowing the paper to be stretched in a fashion similar to an expanded metal screen. In this stretching process, each discrete slit widens, creating multiple openings through the paper. During the stretching of each paper layer, the strips of the paper, between slits, naturally twist to form a three-dimensional structure. Once expanded, each paper layer is heavily resinated to fix the paper in the expanded position. Layers of the expanded paper are then stacked atop one another resulting in a three-dimensional assembly having a tortuous path of openings through its thickness through which an air stream is directed.

Typically, the selection of a particular construction type is dependent upon a variety of factors, including cost requirements and use of the filter structure.

Since the present invention was first developed with a view towards use in a paint booth exhaust system, the problems associated with prior art filters in this setting will be more specifically addressed. The first decision to be made in filtration systems for paint booths is the type of filter structure to be utilized. Expanded paper filters are typically not effective barrier filters because of the large individual openings through the expanded paper filter. However, expanded paper filters can be effective in paint arrestance applications, because of the adhesive nature of the paint droplets. The contact of a paint droplet with the surface of the paper as an air stream proceeds through a filter, causes the droplet to adhere and be retained in the filter.

The main drawback with paper filters in paint arrestance applications lies in the fact that paint droplets passing through the filters exist in a very large range of sizes. Depending upon the size of the droplet and the type of paint, the paint droplets can dry and lose their adhesive qualities before contacting the filter media. In such a case, the solid paint particulate will not adhere to the paper, but rather will "bounce" through the filter media as it is pushed by the air stream moving through the filter. In an attempt to overcome this particular problem, most prior art paper filters utilize a thin layer of high loft non-woven batting as a final filtration stage, to capture dried paint droplets. The use of a high loft non-woven batting for the final stage of an expanded paper filter differs from the present invention in that the final layer of paper actually reduces the usable surface area of the high loft because the intimate contact between paper and high loft reduces the entrance surface area to the high loft batting. The main advantage of utilizing an expanded paper filter for paint arrestance, is in the large size of the openings through the paper, and the tortuous path taken by the air stream through the filter media. The large openings allow for the retention of significant quantities of paint particulate before the opening becomes overly restrictive due to paint accumulation. This restriction of the opening size increases the pressure drop through the media, thereby increasing the energy required to move air through the filter media. The tortuous path increases the possibility that paint droplets will contact the paper so as to adhere to the filter material.

While the expanded paper filter provides advantageous use in the area of paint arrestance, fibrous non-woven filter media are more adaptable to a wide variety of particulate filtration applications. In the production of non-woven battings from manmade fibers, the denier (the relative diameter) of the fibers may be chosen so as to define the size of the effective openings through the batting and thereby the effectiveness of the barrier filtration characteristic of the filter. Thus, the larger the denier of fiber utilized, the larger the effective opening sizes through the batting.

In determining an appropriate opening size for filter media, the characteristic of "surface loading" must be considered. Because the density of the particulate within the air stream is greater as the air stream enters the surface of the media, this entrance surface will generally "load" much more quickly than locations deeper within the filter. This loading obviously restricts the opening size and thereby increases the pressure drop of the filter media. Because of the loading of this surface, the filter media will require replacement (due to the increased pressure drop at the entrance surface) well before the full extent of the media has been utilized in capturing a particulate from the air stream.

It can therefore be seen that a compromise must be made between larger opening sizes (which provide lower pressure drop, greater holding capacity, and less surface loading) and smaller opening sizes (which provide increased particulate removal efficiency through a greater range of particulate size). While the fiber size may be adjusted as part of the "compromise", additional methods have been utilized to enhance the holding capacity of filter media without compromising the removal efficiency. Four general methods have been utilized in the prior art: (1) pleating of the media; (2) sewing or gluing the media into multiple "bags"; (3) multiple stage filters; and (4) mist separators.

In the first method, the filter media is pleated so as to increase the surface area of the filter element while retaining a small opening size. Typically, a thin metal mesh is laminated to the media to form a product which is mechanically pleated into an "accordion" shape. There are several drawbacks to this method. First, there is an increased cost in view of the metal material utilized and the lamination/pleating steps. Second, safety risks increase during the handling of the metal mesh due to the very sharp edges of the mesh. An increase in disposal and recycling problems are created by the combination of metal and otherwise disposable fibrous products. Finally, there is a lack of tensile strength in this type of filter media.

In order to utilize the pleated material described above, it must be adequately supported by an external frame. Otherwise, any application of tensile forces perpendicular to the pleat lines of the filter media would result in the flattening of the pleats. This lack of tensile strength prohibits the use of such filter media in any application which requires high tensile strength (such as on-roll commercial HVAC filtration in which the media is pulled from a supply roll, across the air duct work, and then wound up on a collection roll).

The second method identified above consists of sewing or gluing the filter media into multiple "bags" which are open at the entry plane of the filter and which extend downstream. Drawbacks of this method include the higher manufacturing costs of producing the "bags" and the higher initial cost in utilizing additional piping and physical space for this type of filter.

The third method utilized to improve the holding capacity of the media is to produce a multiple stage filter in which continuous, homogenous layers of non-woven fiber battings having different effective openness are laminated together. This creates a filtration media wherein the fluid steam is first presented to a more open layer having a larger denier, for removal of larger size particulate. The fluid stream then advances to layers of successively reduced openness to remove remaining smaller size particulate. The resultant filter is as efficient as that stage which has the smallest openings, but that final stage is not exposed to the full quantity of particulate and thereby minimizes the surface loading effect and extends the usable life of the filter.

The main drawback to the described multiple stage filter is that the entrance plane of the first layer and the interfaces between layers still act as entrance surfaces and are therefore subject to surface loading. In the case of paint arrestance filters where the paint droplets are of an adhesive nature, even a very open yet still continuous, fiber batting will capture most droplets at the entrance plane of the first batting causing surface loading of this batting. While the surface loading effect is minimized by the layered arrangement, it is still present.

The final method of enhancing a filtration media is described in U.S. Pat. No. 4,443,233 showing an improved mist separator. In this patent, a plate of metal is formed into a shape having raised and lowered areas. A fluid stream traveling through the plate follows tortuous changes of direction. During these changes of directions, large droplets (having greater momentum) will not change direction with the fluid stream, but rather will continue in a straight line until contact is made with the plate. In the use of such a filter to remove liquid particulate from an air stream, the liquid would condense on the plate, and the surface tension of the liquid would retain it on the plate.

Use of the mist separator filtration media for solid particulate filtration presents two major drawbacks. First, there would be a higher cost of materials due to the use of a metal plate, which thereby restricts the use of this media as a disposable filter. Second, the ability of the plate to retain solid particulate is minimal, because of the limitations of electromechanical attractions. After only a slight buildup of solid particulate occurs on the plate, the force of the fluid stream traveling past the plate would become sufficient to dislodge any additional buildup. In fact, the patent indicates that it is still necessary to provide a final stage of standard non-woven batting to capture smaller solid particulate.

In addition, this layer of standard batting would suffer severely from the surface loading effect since the presence of the metal plate would actually reduce the surface area of the batting due to its intimate contact with the batting.

SUMMARY OF THE INVENTION

It is therefore a general object of the present invention to provide an improved fluid filter.

Another object is to provide an improved fluid filter with a three-dimensional structure providing portions of the entrance surface area which are shielded from the direct line of incoming fluid stream.

Yet another object is to provide an improved fluid filter which is manufactured from low cost materials.

Still another object is to provide an improved three-dimensional fluid filter manufactured from high loft non-woven materials.

These and other objects will be apparent to those skilled in the art.

The fluid filter of the present invention includes a first batting of high loft, non-woven, fibrous, fluid-permeable material with a plurality of openings formed through the thickness thereof across the length and width of the batting. A second layer of continuous, high loft, non-woven, fluid-permeable fibrous batting is attached to the first layer and extends across the entire length and width of the first layer. Preferably, the first and second layers are adhered together to form a single integral fluid filter. In the preferred form of the invention, the openings in the first batting have side walls which are perpendicular to the upper surface of the batting, such that fluid flow impacts on the upper surface of the batting, rather than directly impacting on the side walls.

DESCRIPTION OF THE PREFERRED EMBODIMENTS

Figure 1:
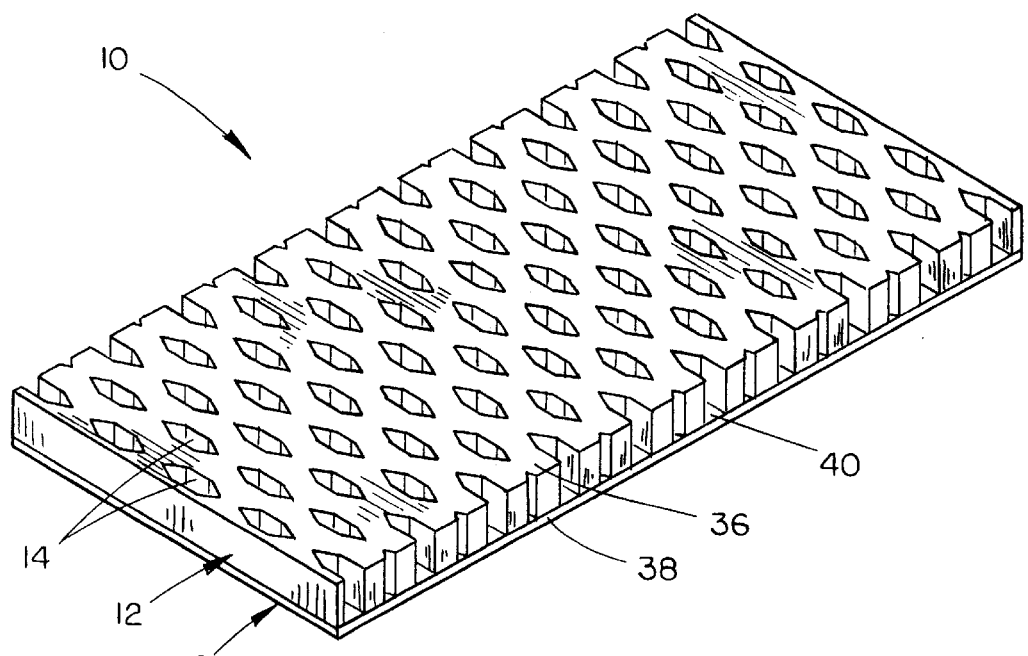
FIG. 1 is a perspective view of a fluid filter of the present invention.

Referring now to the drawings, in which similar or corresponding parts are identified with the same reference numeral, and more particularly to FIG. 1, the fluid filter of the present invention is designated generally at 10 and includes a first layer 12 of a stabilized, high loft, non-woven batting expanded so as to form a plurality of generally vertical openings 14 therethrough. A second layer 16 of continuous, stabilized, non-woven batting is arranged in combination with first layer 12, as described in more detail hereinbelow.

Figure 2:
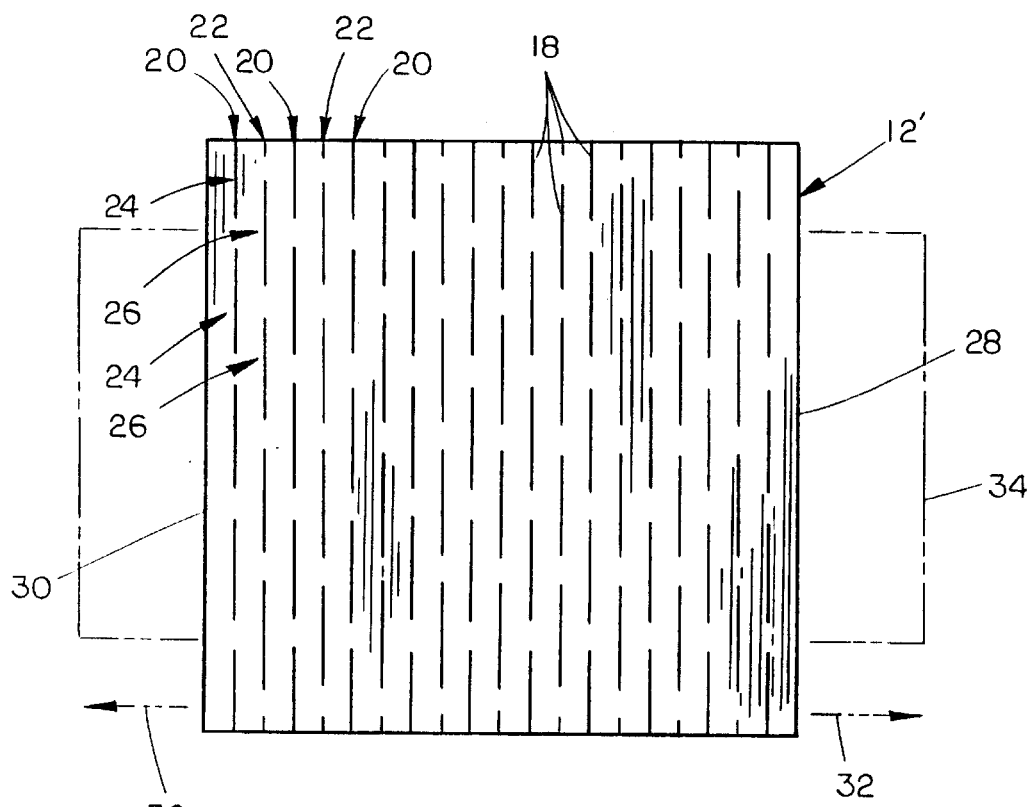
FIG. 2 is a top plan view of a sheet of batting material showing the first step in manufacturing an expanded batting.
Figure 3:
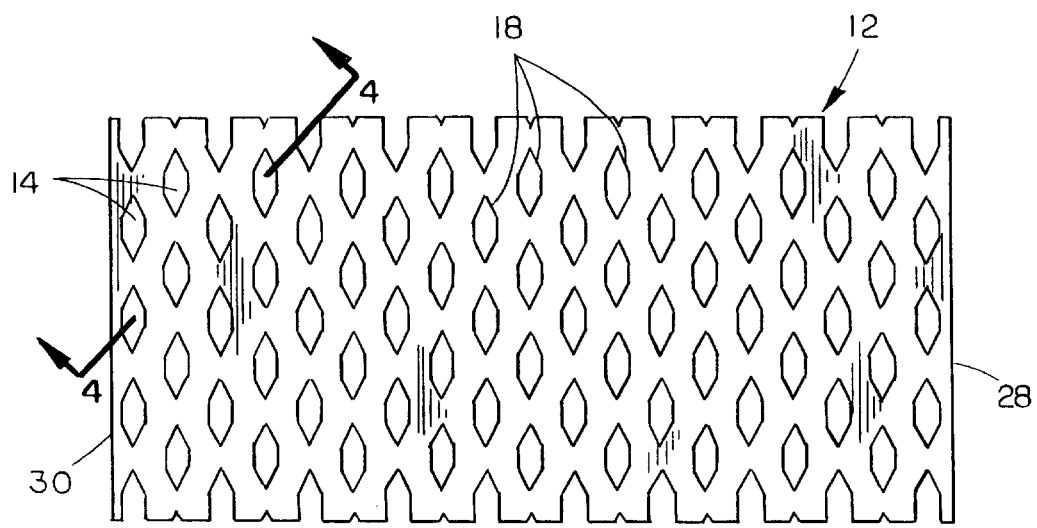
FIG. 3 is a top plan view showing a subsequent step in the manufacture of the expanded batting.

Referring now to FIG. 2, the preferred method for creating first layer 12 with perforations 14 begins with a first, stabilized, non-woven batting 12' which has been repeatedly slit through its thickness. Preferably slits 18 are formed in rows and columns such that alternating columns 20 of slits 18 have the slits offset with respect to adjacent alternating columns 22. In this way, alternating offset rows 24 and 26 of slits 18 are also formed. The side edges 28 and 30 of batting 12' are then pulled apart, as shown by arrows 32, in a direction perpendicular to the length of slits 18, to an orientation shown by dashed line 34. This unidirectional stretching will open or "expand" the batting at each slit 18, as shown in FIG. 3, to form openings 14. Preferably, the batting is composed of a thermosetting manmade material, such that the expanded batting 12 may be heated to set the batting in the expanded condition.

Referring once again to FIG. 1, the expanded batting 12 includes an upper entrance surface 36 and a lower exit surface 38. Expanded batting 12 is attached to the upper surface 40 of continuous batting layer 16 to form the composite fluid filter 10. Preferably, expanded batting 12 is glued or laminated to second layer 16, such that the force of a fluid stream on the upper surface 40 of the second layer 16 will not separate the first and second layers.

Figure 4:
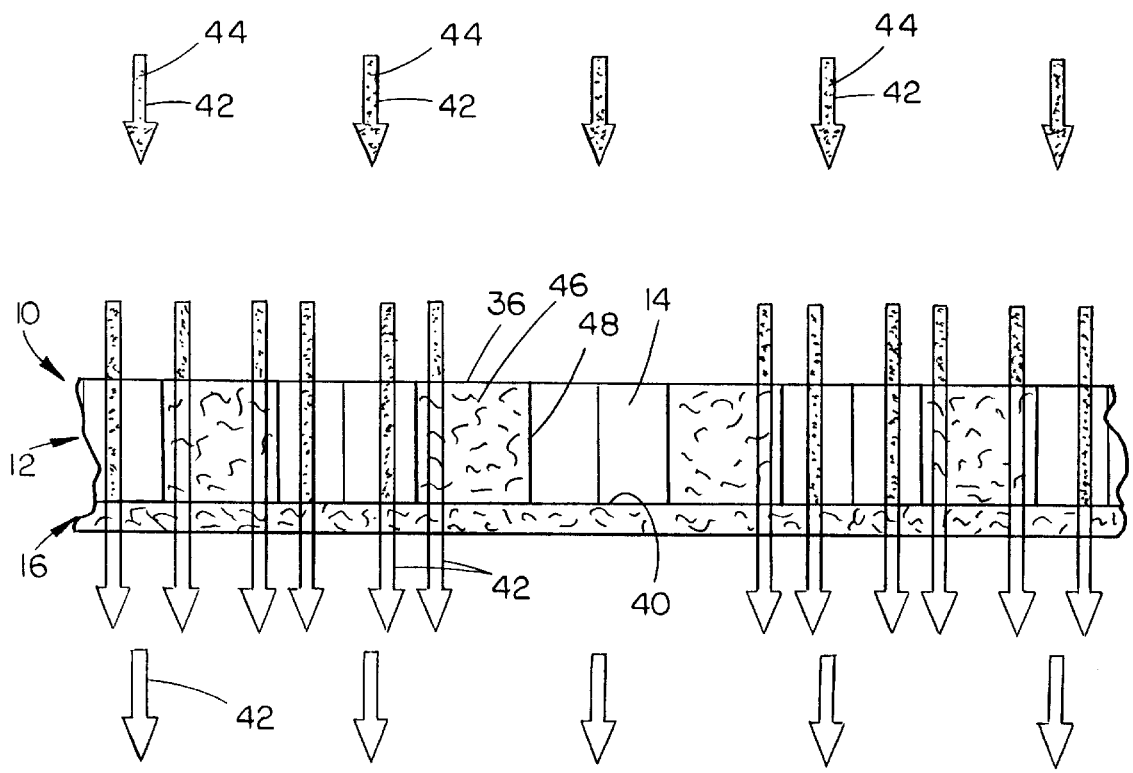
FIG. 4 is a cross-sectional view taken at lines 4—4 in FIG. 3.

Referring now to FIG. 4, the cross-sectional view of fluid filter 10 shows expanded batting 12 attached to second layer batting 16, with openings 14 extending from entrance surface 36 to the upper surface 40 of second layer 16. Arrows 42 are schematic representations of fluid flow through filter 10, with particulate 44 indicated within fluid flow arrows 42 prior to passage through filter 10.

FIG. 4 represents a "clean" filter, in that no particulate has accumulated on any of the surfaces of the filter. As shown in FIG. 4, fluid flow is initially directly through the filter 10, through both the openings 14 and walls 46 of expanded batting 12, as well as through second batting layer 16. It can be seen that the vertical side walls 48 of expanded batting walls 46 are not in the direct line of the incoming fluid flow stream. Thus, side walls 48 are protected or shielded from the direct impact of the incoming air stream, and the air stream will tend to "wash" any accumulated particulates from side walls 48.

Figure 5:
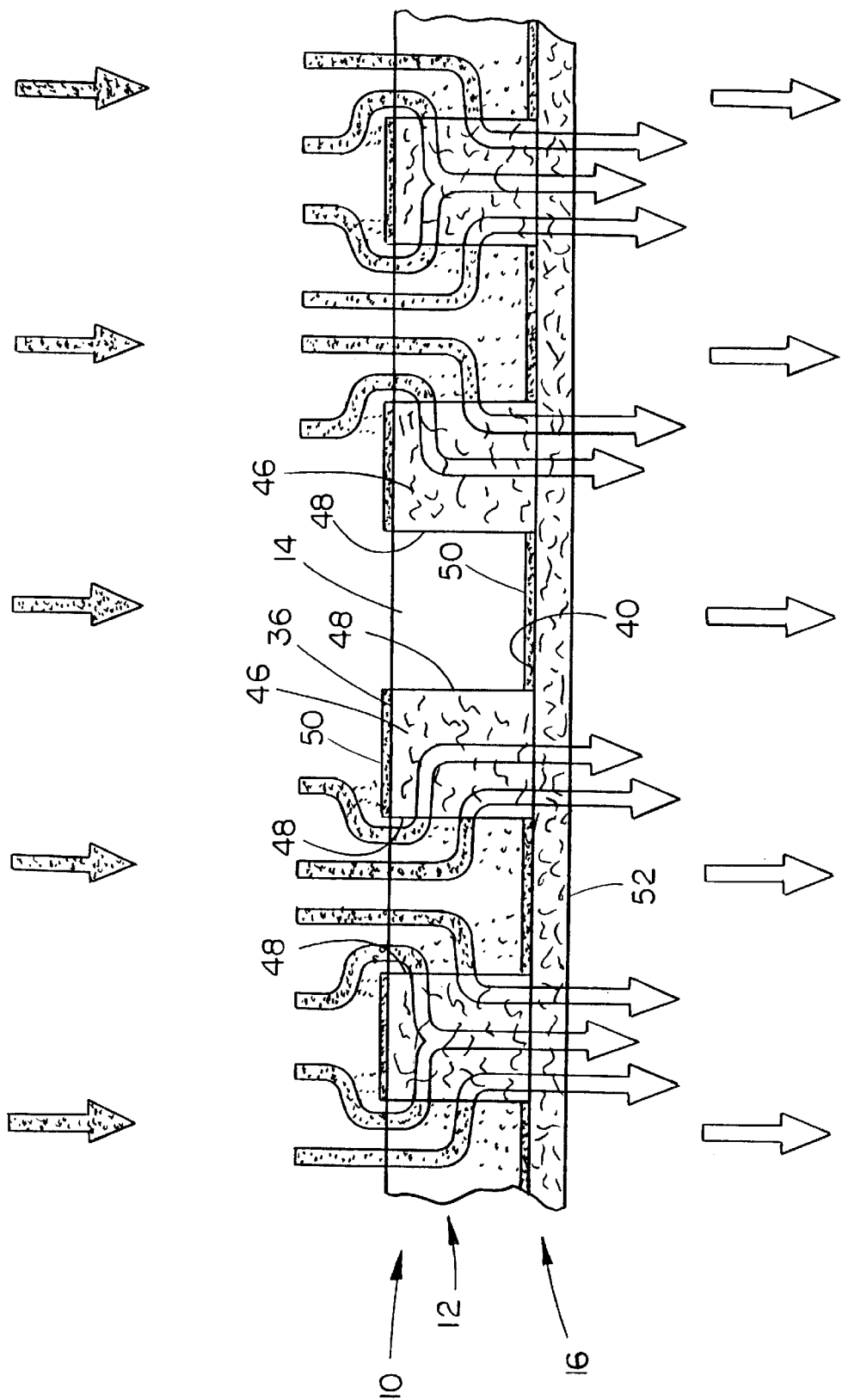
FIG. 5 is a cross-sectional view similar to FIG. 4.

Referring now to FIG. 5, a cross-sectional view through the same portion of filter 10 is shown, after some particulate has accumulated. As the filter 10 continues to remove particulate from the fluid stream, the captured particulate will accumulate on the entrance surface 36 of batting 12, as well as those portions of upper surface 40 of second layer 16 which are exposed to direct impact of fluid flow through openings 14. This accumulation of particulate is indicated by particulate layer 50, and serves to close off the permeability of battings 12 and 16 from fluid flow. As the accumulation of particulate layer 50 continues, the resistance to fluid flow increases, such that the fluid flow stream will seek a path of lesser resistance by turning and entering through side walls 48 of expanded batting walls 46. As the fluid stream turns sharply, particulate will tend to continue in a straight direction due to the momentum of the particulate, thereby falling onto particulate layers 50. The turned air stream, which has a much lesser concentration of particulate, is then filtered through expanded batting walls 46 and those portions of second layer 16 located directly below walls 46, before exiting the downstream, or lower surface 52 of second batting 16.

In this way, it can be seen that openings 14 can continue to accumulate particulate layers, while still permitting air flow through the side walls of the expanded batting, without a significant increase in pressure drop. This combination of expanded batting and continuous batting provides several benefits. First, the side walls 48 of expanded batting walls 46 increase the total filtration surface area which can be incorporated into a given volume of filtration media, thereby reducing the surface loading effect.

Second, the utilization of expanded batting 12 guarantees that at least some significant portion of the surface area is shielded from the direct line of travel of incoming particulate air stream, thereby minimizing the concentration of particulate presented to the shielded surface, and ultimately increasing the usable life of the filter 10.

Third, while the surface area in direct line of incoming air stream will be subject to the same surface loading of prior art filtration media, the side walls 48 permit continued use of the filter 10 beyond the point when conventional filter media would be forced to be discarded. As the direct line surfaces load with particulate, the resistance to fluid flow will increase, causing the air stream to turn and pursue a course of lesser resistance through side walls 48. The tortuous path through the filter 10 will cause particulate to be deposited on particulate layers 50 rather than side walls 48. This deposition process increases the holding capacity of the filter 10 without increasing pressure drop.

Finally, the filter 10 of the present invention differs from other filtration media which turns an air stream through a tortuous path, (such as the expanded paper paint arrestor described in the background) in that the prior art media turn the air stream away from the material which is intended to capture the particulate. The present invention directs the turned air stream towards the filtration media (the walls 46).

Figure 6:
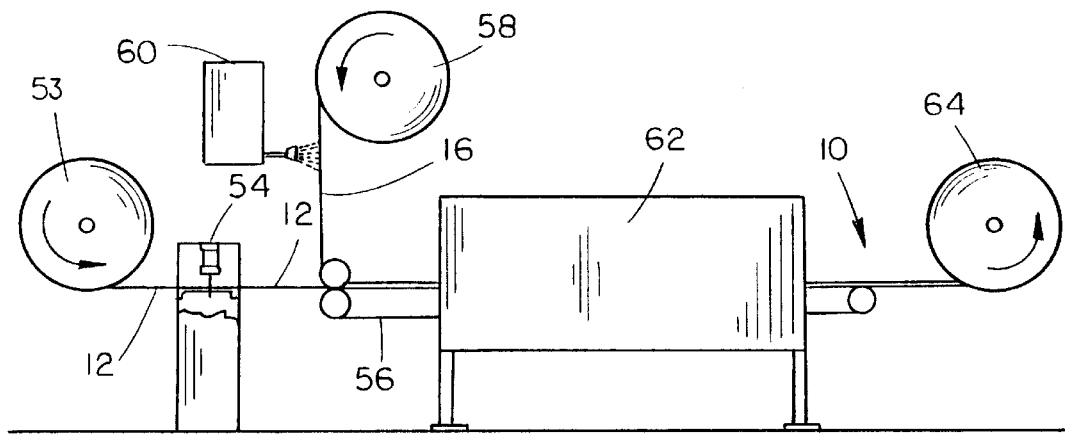
FIG. 6 is a schematic diagram showing one process for manufacturing the fluid filter of the present invention.

Referring now to FIG. 6, a schematic diagram showing one method for manufacturing the fluid filter of the present invention is disclosed. A supply roll 53 feeds a continuous sheet of the first batting 12' to a slitting machine 54. A conveyor belt 56 pulls the slit batting 12 away from the slitting machine at a linear speed which is faster than the speed at which supply roll 53 feeds batting 12' to slitting machine 54. The differences in speed causes batting 12 to stretch and open up the slits formed by slitting machine 54, as described in more detail hereinabove.

A second supply roll 58 feeds the second batting layer 16 past an adhesive applicator 60, where adhesive is applied to the continuous second batting layer 16. Second batting layer 16 then is immediately contacted with the expanded batting 12 at conveyor belt 56, to attach the two layers. The composite of expanded batting 12 and second batting layer 16 then proceeds through an oven 62 which will cure the adhesive and thermally set the expanded batting 12 in its stretched condition. The final fluid filter 10 exits oven 62 and is stored on wind-up roll 64 for final packaging.

While the above-described manufacturing method is preferred, it should be understood that other methods are possible for creating the fluid filter of the present invention.

For example, a first non-woven batting may be cut into multiple strips which are laminated to a second non-woven batting. While the end result would produce continuous slots rather than individual openings in one layer of the batting, it would provide vertical surface area which is protected from the direct line of incoming particulate in an air stream.

A second method would involve the removal (i.e. by die cutting or the like) of material from a first non-woven batting to form an apertured batting. This could then be attached to a second batting to create the fluid filter of the present invention.

Figure 7:
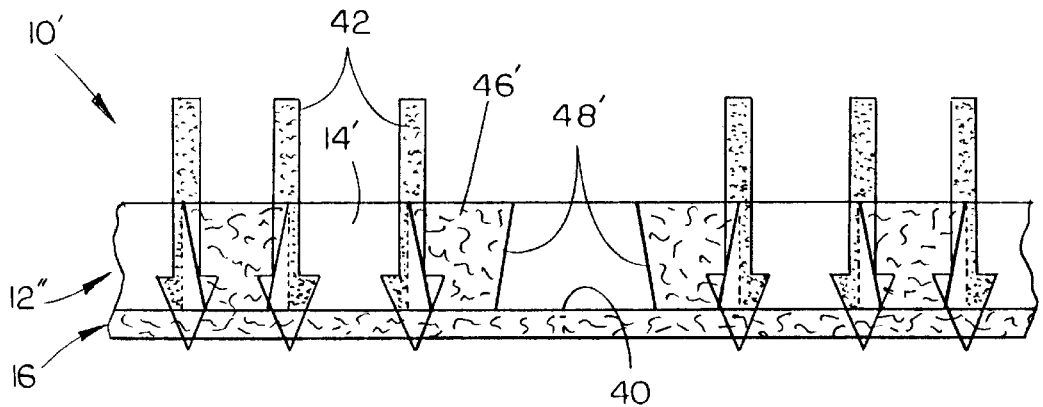
FIG. 7 is a partial cross-sectional view through a second embodiment of the fluid filter.

Referring now to FIG. 7, a second embodiment of the fluid filter is designated generally at 10' and includes a first upper layer 12" with openings 14' formed through the thickness thereof. The second layer 16 is attached to the bottom surface of wall portions 46' of first batting 12". As with the first embodiment, wall portions 46' have side walls 48' which are protected from direct impact of particulate from the fluid flow, shown by arrows 42. Thus, the main difference between the first and second embodiments of the invention is in the orientation of side walls 48' relative to the direction of fluid flow. The critical factor in establishing this orientation is that a significant portion of side walls 48 should be protected from the direct line of the incoming fluid flow stream. In the second embodiment of fluid filter 10', it can be seen that the entire surface area of side walls 48' is shielded from direct impact from the fluid flow. In addition, a portion of the upper surface 40 of second layer 16 within openings 14', is also protected, where aligned under the overhanging portions of walls 46'.

Figure 8:
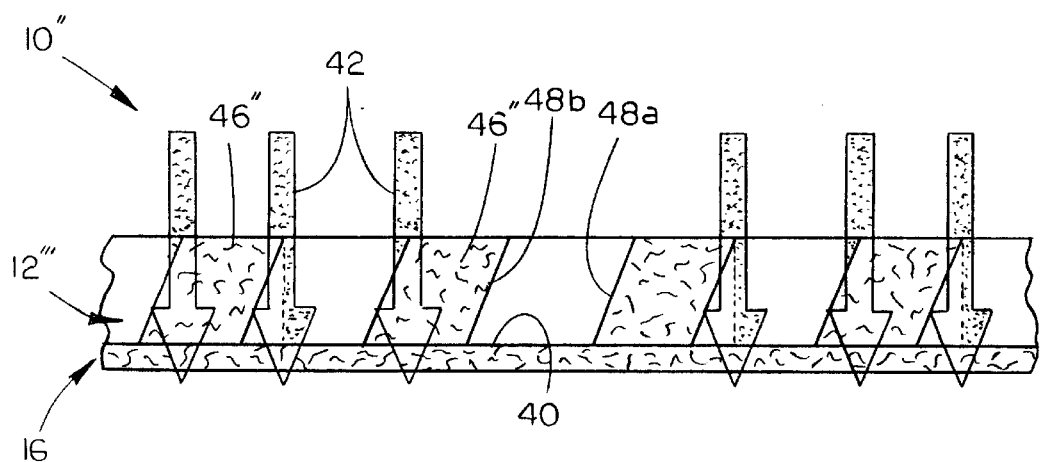
FIG. 8 is a partial cross-sectional view through a third embodiment of the fluid filter.

FIG. 8 shows a third embodiment of the fluid filter, which is designated generally at 10". In this embodiment, the upper batting layer 12''' includes side walls 46" which are slanted at a slight angle relative to the direction of fluid flow shown by arrows 42. While this slant exposes one side wall 48a to direct impact from the fluid flow, it protects the opposite side wall 48b, as well as a portion of the upper surface 40 of second layer 16 lying below the overhanging portion of wall portions 46".

While the fluid filter 10 of the present invention may be used in a wide variety of industries and applications, the inventor herein has been successful in applying the filter 10 for paint spray booth overspray arrestance. As shown in FIG. 2, the upper batting 12' is manufactured from 40 Denier 2 inch polyester staple fibers, with the basic web structure created in the standard method utilizing garnetting equipment, airlaying equipment, and the like well known in the industry.

First batting 12' is stabilized using spray-applied acrylic latex emulsion applied to the web and then cured in a natural gas fired continuous process oven. Batting 12' preferably has a basis weight of 1.0 ounce per square foot and a thickness of approximately 1.25 to 1.50 inches.

Batting 12' is then slit in the pattern shown in FIG. 2, where each slit 18 is 3 inches long, the distance between aligned slits in a column 20 or 22 is 0.75 inch, and the columns of slits 20 and 22 are separated by 0.75 inch.

Batting 12' is then stretched in a direction perpendicular to the longitudinal axis of the slits, to form generally "football" shaped openings 14, as shown in FIG. 3. Preferably, each opening 14 has a longitudinal length of approximately 2.5 inches and a transverse width of approximately 1.25 inch.

The continuous second batting layer 16, shown in FIG. 1, is formed of 6 Denier 2 inch polyester staple fibers having a basis weight of 0.3 ounce per square foot and a thickness of approximately 0.25 inch. The second batting is stabilized in the same manner as first batting 12, and is brought into contact with the bottom surface of the expanded first batting. As shown in FIG. 6, acrylic latex emulsion is sprayed on second batting layer 16 to adhere first batting 12 to second batting 16. Individual panels of various lengths and widths may then be cut from the finished roll 64.

Laboratory experiments comparing the above-described composite fluid filter 10 to prior art continuous sheet laminates of 40 Denier/6 Denier, have yielded results indicating the composite structure of the present invention to have over four times the particulate retaining capacity of the prior art composite for a given increase in pressure drop, without compromising the capture efficiency.

Whereas the invention has been shown and described in connection with the preferred embodiments thereof, it will be understood that many modifications, substitutions and additions may be made which are within the intended broad scope of the appended claims. There has therefore been shown and described an improved fluid filter which accomplishes at least all of the above stated objects.

I claim:

1. A fluid filter, comprising:

a first layer of fluid-permeable material having an upper surface, a lower surface, a pair of opposing, spaced-apart side edges and a width measured between said side edges, a pair of opposing longitudinal ends and a length measured between said ends, and a thickness measured between the upper and lower surfaces;

said first layer having a plurality of spaced apart openings extending through the thickness thereof, forming a plurality of walls separating said openings; and a second layer of fluid-permeable material having an upper surface, a lower surface, and a length and width equal to that of the first layer, abutting the first layer with the upper surface of the second layer in contact with the lower surface of the first layer.

2. The fluid filter of claim 1, wherein sad second layer is affixed to the first layer to form an integral composite fluid filter.

3. The fluid filter of claim 2, wherein said second layer is formed of a continuous, homogeneous, high loft, non-woven fibrous batting.

4. The fluid filter of claim 1, wherein said openings in said first layer are uniformly spaced across the length and width of the layer.

5. The fluid filter of claim 4, wherein said openings are all substantially equal in size.

6. The fluid filter of claim 1, wherein said walls include wall surface forming the boundaries of said openings.

7. The fluid filter of claim 6, wherein said wall surfaces are substantially perpendicular to the upper surface.

8. The fluid filter of claim 6, wherein said wall surfaces are sloped, such that the size of the openings at the lower surface are greater than the size of the openings at the upper surface.

9. The fluid filter of claim 1, wherein said first and second layers are each formed of a high loft non-woven fibrous batting.

10. The fluid filter of claim 9, wherein said battings are formed of manmade fibers.

11. A method for increasing the filtering surface area of a fluid filter, comprising the steps of:

providing a first layer of fluid-permeable material, having an upper surface, a lower surface, length and width, and a thickness measured between the upper and lower surface;

cutting a plurality of parallel spaced apart slits completely through the thickness of the first layer in the length direction of the layer, said slits extending less than the entire length of the layer;

stretching the first layer in the width direction transverse to the length of the slits, to increase the width of the layer and expand openings formed by the slits through the thickness of the layer;

fixing the stretched layer in an expanded condition; and placing the first layer in abutting contact with a second layer of fluid-permeable material, the second layer having a length and width equal to the first layer, so as to cover all of the openings in the first layer.

12. A fluid filter, comprising:

a layer of fluid-permeable material having an upper surface, a lower surface, a pair of opposing, spaced-apart side edges and a width measured between said side edges, a pair of opposing longitudinal ends and a length measured between said ends, and a thickness measured between the upper and lower surfaces;

said layer having a plurality of spaced apart openings extending through less than the entire thickness of the layer, from the upper surface towards the lower surface.

13. The fluid filter of claim 12, wherein said openings are uniformly spaced across the entirety of said layer, and are substantially equal in size and depth.

14. A method of filtering particulate material from a generally unidirectional fluid stream, comprising the steps of:

providing a layer of fluid-permeable material, having an upper surface, a lower surface, a pair of opposing, spaced-apart side edges and a width measured between said side edges, a pair of opposing longitudinal ends and a length measured between said ends, and a thickness measured between the upper and lower surfaces, said layer having a plurality of spaced apart openings extending less than the entire thickness of the layer from the upper surface towards the lower surface, said openings having a bottom surface and defining a plurality of walls separating said openings, s aid walls having an upper surface and side wall surfaces formed at an angle relative to the upper surface;

positioning the layer in the fluid stream with the layer upper surface oriented up-stream of the layer lower surface, whereby said fluid stream initially passes through said wall upper surfaces and opening bottom surfaces, thence through the walls and layer of material, and thence outwardly through the lower surface of the layer.

15. The method of claim 14, wherein said layer is generally planar, and wherein the step of positioning the layer in the fluid stream includes the step of orienting the layer with the upper surface generally perpendicular to the fluid stream such that fluid with particulate first contacts the wall upper surfaces and the opening bottom surfaces.

16. The method of claim 15, wherein the step of providing the layer of material includes the step of providing a layer of material with a porosity adapted to filter particulate of a predetermined size from the fluid stream, wherein the fluid stream is diverted to enter the layer of material through the side wall surfaces when the wall upper surfaces and opening bottom surfaces become clogged with particulate, the diverted fluid stream proceeding through the walls and thence through the layer, and thence outwardly through the lower surface of the layer.

17. The method of claim 14, wherein the step of providing a layer of material includes the step of providing a first and second portion of said layer, the first portion having said openings extending completely therethrough, and said second portion located adjacent the first portion to form the bottom surfaces of the openings and the lower surface of the layer.

18. The method of claim 14, wherein said fluid stream is a stream of air, and wherein said fluid-permeable material is air-permeable.

19. The method of claim 18, wherein said particulate material is liquid.

20. The method of claim 19, wherein said particulate material is liquid paint.

21. The product produced by the method of claim 11.

* * * * *